United States Patent [19]

Yamamoto et al.

[11] Patent Number: 5,090,029
[45] Date of Patent: Feb. 18, 1992

[54] DATA COMMUNICATION METHOD AND APPARATUS

[75] Inventors: Toshifumi Yamamoto, Hitachi; Mitsuro Takakura, Katsuta; Hiromasa Yamaoka, Hitachi; Masakazu Okada, Katsuta, all of Japan

[73] Assignee: Hitachi, Ltd., Tokyo, Japan

[21] Appl. No.: 345,580

[22] Filed: May 1, 1989

Related U.S. Application Data

[63] Continuation of Ser. No. 92,448, Sep. 3, 1987, abandoned.

[30] Foreign Application Priority Data

Sep. 5, 1986 [JP] Japan ............... 61-207904

[51] Int. Cl.[5] .................................................. H04J 3/26
[52] U.S. Cl. ................................ 375/107; 340/825.14; 370/94.1; 375/111
[58] Field of Search ............... 375/107, 111, 114, 116; 370/94.1, 105.1, 85.15, 85.1, 106; 340/825.14, 825.52, 825.53

[56] References Cited

U.S. PATENT DOCUMENTS

| | | | |
|---|---|---|---|
| 3,710,027 | 1/1973 | Herter et al. | 375/107 |
| 4,054,753 | 10/1977 | Kaul et al. | 375/107 |
| 4,135,060 | 1/1979 | Heckel et al. | 370/105.1 |
| 4,136,384 | 1/1979 | Oxada et al. | 370/105.1 |
| 4,596,013 | 6/1986 | Tashiro et al. | 370/85.15 |

OTHER PUBLICATIONS

Fäber, Georg, Bussysteme, R. Oldenbourg, Munich, 1984, pp. 109-110; 111-113; 115.

*Primary Examiner*—Benedict V. Safourek
*Attorney, Agent, or Firm*—Fay, Sharpe, Beall, Fagan, Minnich & McKee

[57] ABSTRACT

A method and apparatus for transmission of data among computers or peripherals along a loop transmission line includes a master system which provides signals along the transmission line for establishing a series of data frames of equivalent length. Each data frame is assigned a frame number, and is allotted a preselected amount of available space for placement of data. Subsequent computers or peripherals are preprogramed with a series of frame numbers which identify those data frames into which they may write data, or from which data is to be read. The allotment of preselected frame numbers for placement and reception of data by the respective devices provides for equivalent sharing of the available data transmission capability of the loop transmission system.

20 Claims, 4 Drawing Sheets

DATA COMMUNICATION METHOD AND APPARATUS

This is a continuation of co-pending application Ser. No. 07/092,448 filed on Sept. 3, 1987, now abandoned.

BACKGROUND OF THE INVENTION

This application pertains to the art of data communication, and more particularly to the art of cyclic data transfers among data equipment. The present invention is particularly applicable to a loop data transmission system which is suited for realizing high-speed data communication among computers or peripherals, and will be described with particular reference thereto. It will be appreciated, however, that the invention has broader applications such as communication of data between a computer and a peripheral, or among peripherals.

In a prior loop transmission system, a token passing system has predominately been adopted. In such a "token ring" system, frame information for assuring the priority of data transmission is circulated along the transmission line in groups of data often referred to as "frames." A frame with priority is allowed to conduct and maintain data communication between devices, thereby avoiding collisions between messages to be transmitted. Such a system is disclosed in JPO-A-57-81746.

Such a system is disadvantageous in that a high frequency of transmissions by a particular data transmission apparatus results in less availability of the loop transmission line for communication among other sets of apparatuses, and a correspondingly lower frequency of transmissions therebetween. Any attempt to transmit with a predetermined constant period encounters difficulty, as such a constant period is difficult to establish consistently without being disturbed.

Prior systems are not suited for cyclic communication such as is desirable for transmission of data at a constant period. Any difference in the frequency of transmission requests results in a disturbance in the periodicity of the transmission.

Another problem with the prior system is that it is not suited for a system in which a short transfer period is required. The priority assurance data which is circulated in previous systems also takes up considerble transmission time, thereby limiting the amount of useful data which may be transmitted over the system. In addition, more useful transmission time may be forfeited when explicit address information for memory interaction must be transmitted, thus further decreasing the efficiency rate of transmission of useful data.

SUMMARY OF THE INVENTION

The present invention contemplates new and improved method and apparatus which overcomes the above-referred problems, and others, and provides a data communication system which is economical and efficient.

In accordance with the present invention, an arrangement in which data of a predetermined constant length, called a frame, is circulated on and along a loop transmission line interconnecting a plurality of data communication apparatuses is provided. The frame is provided with data transmission fields, or time slots, which are dedicated to transmissions between selected individual data communication apparatuses. The data transfer among individual data transmission apparatuses is performed by means of these time slots. Thus, a stable, cyclic communication system with improved periodicity is realized.

In accordance with another aspect of the present invention, the frame is circulated on and along a transmission line along with an attached frame number which serves as an identifier for distinguishing one frame from another. Means is provided for counting sequencially the time slots from the leading portion of the frame. In such a manner, the time slots are reservedly allotted to respective data apparatuses, whereby cyclic communication which coincides with the circulation period of time slots is realized.

An object of the present invention is the provision of a one-to-one correspondence relationship between data frame time slots and memory locations to which data is directed, which makes use of a frame identifier, whereby transmission of address information is rendered unnecessary. This provides a data transmission system with higher efficiency.

A further object of the invention is the adoption of a time slot system in which a data transmission frame circulates within a predetermined constant period. This provides a cyclic communication scheme where data is updated every predetermined period.

A further object of the present invention is the provision of a system where one data frame can be shared by a plurality of data transmission apparatuses, therefore allowing for a shortened data transfer rate.

An advantage of the present invention is the provision of a data transmission scheme whereby a one-to-one correspondence is fixedly established between data contained in a time slot of a data frame, and word data stored in a memory. Data transmission may therefore be performed without adding a destination address or a sender address, thereby significantly improving transmission efficiency.

A further advantage of the present invention is implementation of a time slot data transmission system wherein no indefinite standby time is involved, thereby establishing a constant data update period to ensure improved cyclic communication.

A further advantage of the present invention is found by implementation of a frame identification number as part of a memory address signal, thereby compacting the amount of useful data transmitted via the data transmission system.

Still another advantage of the present invention is the provision of a data transmission scheme which may be operated with timing independent of that of another apparatus. Dead time otherwise produced due to mutual interference is decreased significantly, thereby resulting in improved processing performance.

Yet a further advantage of the present invention is the allocation of code data within a data frame to a data transmission apparatus whereby data transfer time is significantly reduced.

Further objects and advantages will become apparent to those of ordinary skill in the art by reading and understanding the following specification.

BRIEF DESCRIPTION OF THE DRAWINGS

The invention may take form in certain parts, arrangements of parts, and steps, preferred embodiments of which will be described in detail in this specification and illustrated in the accompanying drawings which form a part hereof, and wherein.

DETAILED DESCRIPTION OF THE PREFERRED EMBODIMENT

Figure 1:
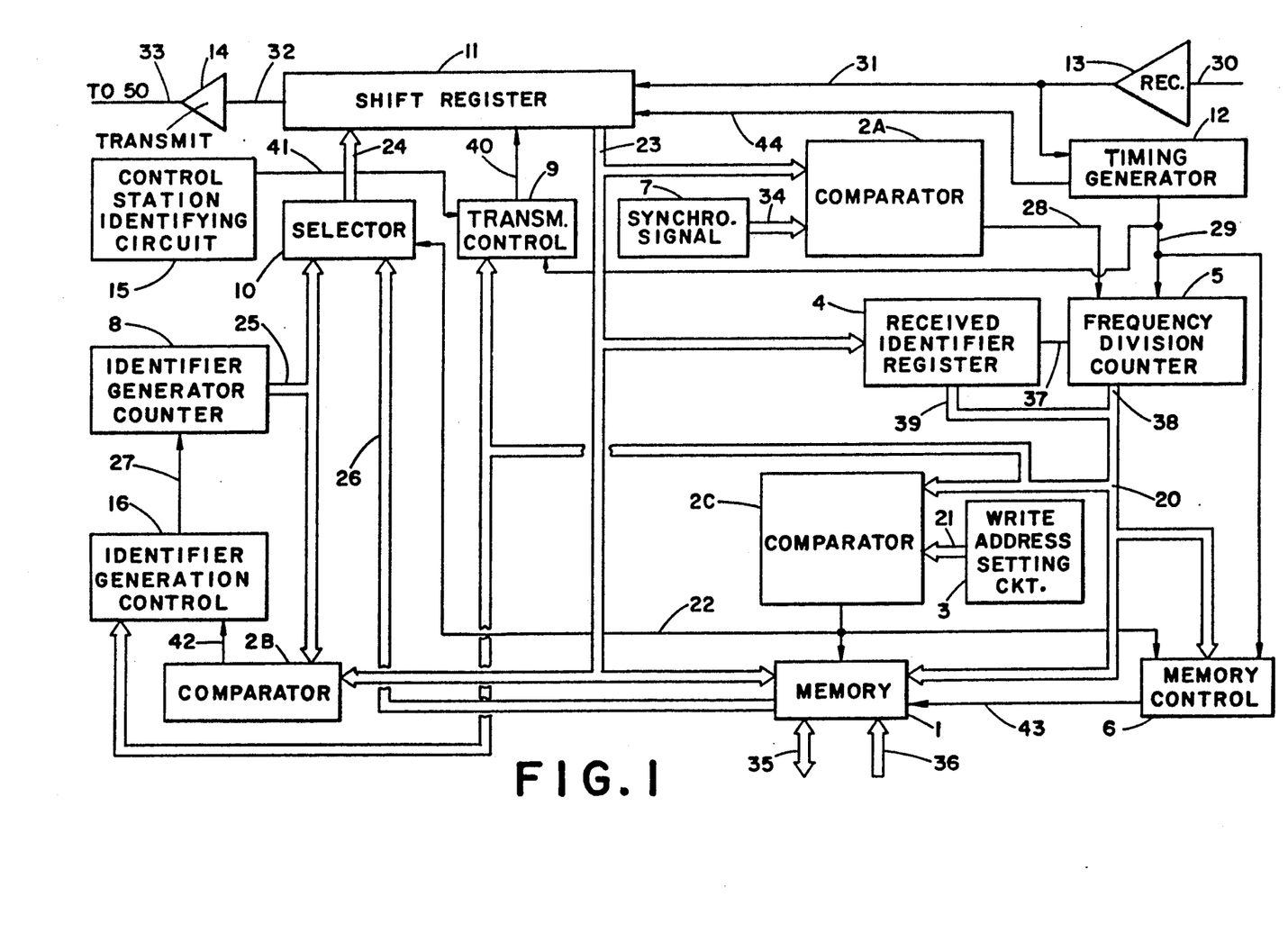
FIG. 1 is a block diagram of the architecture of a unit for transmission or reception of data in data frames, transmitted along a pathway, and for generation of such frames.

FIG. 1 shows in detail a structure of the data communication apparatus according to a preferred embodiment of the present invention. The embodiment of FIG. 1 may function as a master system or control system to serve as a generator means for initialization, generation, and updating of data frames; as a transmission system wherein data is placed in selected frame portions, or as a receiving system where data is read from selected frame portions. Any combination of these functions may be performed by appropriate combinations or subcombinations of the components of the architecture of FIG. 1, as will be fully understood below.

Figure 2:
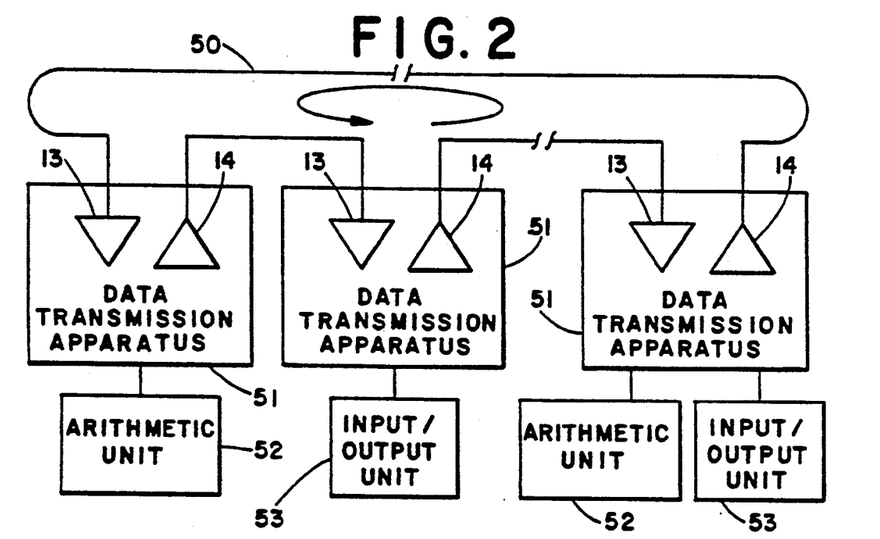
FIG. 2 is a block diagram of a plurality of devices of FIG. 1.

FIG. 2 shows schematically a general arrangement of a data communication system to which the data communication apparatus according to the invention is suitably applied. As will be seen in this figure, the data communication apparatuses 51 are connected to a transmission line 50 in a closed loop configuration. More specifically, the data transmission line 50 and each data communication apparatus 51 is interconnected by way of a receiver unit 13 and a transmitter unit 14. The transmission line 50 may be realized by using optical fiber or twisted pair wires (i.e. in the form of a twisted pair transmission line). Connected to the data transmission apparatus 52 are an arithmetic unit 52 and an input/output unit 53. Data handled by these units is mutually exchanged through the data transmission system.

An initial description of the structure of FIG. 1 is directed to the arrangement of the apparatus. An incoming signal 30 from the transmission line 50 (FIG. 2) is fetched by the data transmission apparatus 51 by way of the receiver unit 13. An input signal 31 thus fetched is applied to a timing generator circuit 12 and a shift register 11. The timing generator circuit 12 serves to generate a clock signal synchronized with data carried by the input signal 30. To this end, the timing generator 12 may be comprised of a phase-locked oscillator "PLO" which is known in the art.

Derived from the output of the timing generator circuit 12 are a shift register clock signal 44 and a basic clock signal 29, wherein the former is applied to the shift register 11 while the latter is applied to a frequency division counter 5, a memory control circuit 6 and a transmission control circuit 9.

The shift register 11 produces a parallel output signal 23 which is applied to comparision circuits 2A, 2B, a received identifier register 4 and a storage or memory 1. The shift register 11 produces a serial output signal 32 which is supplied to the transmission line 50 as an outgoing signal 33 through the transmitter unit 14.

A parallel input signal 24 to the shift register 11 is produced by a selector 10. An output of the transmission control circuit 9 is further applied to the shift register 11 as a load timing signal 40.

A synchronization signal setting circuit 7 produces a synchronization signal, comprised of pattern data 34 which is applied to the comparator 2A in the form of a parallel signal. This comparator 2A produces a synchronous pattern detection signal 28 which is applied to the frequency division counter 5 as a preset signal. The frequency division counter 5 in turn produces an output signal 38 which is combined with an output signal 39 of the received indentifier register 4, to form a word address signal 20 to be applied to the memory 1, the memory control circuit 6, a comparison circuit 2C, the transmission control circuit 9, and a identifier generation control circuit 16.

A write address setting circuit 3 serves to prepare or create an identifier for a frame which is sent out from the data transmission apparatus. This signal, having a set value (identifier signal) 21, is applied to the comparison circuit 2C to be compared with the word address signal 20. The comparison circuit 2C produces a write control signal 22 which is used for read/write control of the memory 1, and is applied to the memory control circuit 6 and the selector 10.

Data, read from the memory 1, is supplied as one input signal 26 to the selector 10, the other input of which is an output signal 25 of an identifier generator counter circuit 8. A control station identifying circuit 15 serves to identify whether the data communication apparatus under consideration serves as a control station. A set value (identification signal) 41 of this circuit 15 is applied to the transmission control circuit 9. An arithmetic unit 52 and the input/output unit 53 (FIG. 2) may access memory 1 with a data signal 35 and an address signal 36.

Figure 3:
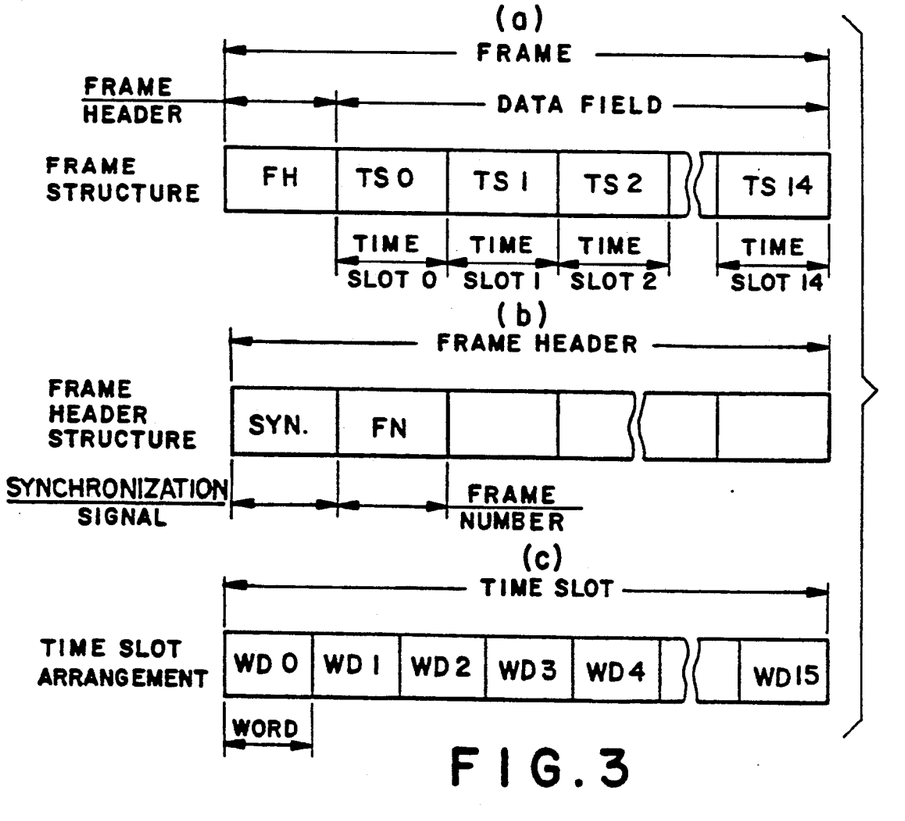
FIG. 3 is a diagram of frame structure of a data transmission frame.

Next, operation of the data communication apparatus of FIG. 1 will be described with additional reference to FIGS. 3, 4, and 5. A format of the signal fed to the data transmission apparatus 51 from the transmission line 50 is illustrated in FIG. 3. The signal traveling along and around the transmission line 50 consists of a set of data referred to as the frame, which is comprised of a frame header (FH in abbreviation) and a data field, as is illustrated at (a). The frame header (FH) is comprised of a bit string which includes a synchronizing signal (SYN in abbrevation) and a frame number (FN in abbreviation), as is illustrated at (b). In the case of the illustrated embodiment, SYN and FN are 16-bit signals, respectively. The remaining locations of the frame header (FH), not allocated for the SYN and FN, is reserved as a field into which additional data can be entered as may be desired.

The synchronizing signal SYN is comprised of a bit train which forms a synchronizing pattern capable of identifying the presence of a frame at the start portion thereof. The frame number FN is an identifier for discriminatingly identifying the frame. In the case of the illustrative embodiment, 16-bit binary signals indicative of the number of "0" to "65535" (64K), respectively, are available for use as the frame number. As will be seen further below, this data also serves as a memory address. Of course, fewer or more frame numbers may be used depending on an amount of memory with which data is to be communicated.

The data field of the frame illustrated in FIG. 3(a) serves as a region into which data to be exchanged by the arithmetic units and the input/out units are loaded and placed. In the case of the illustrated embodiment, the data field includes 15 time slots designated by TS0 to TS14, respectively, wherein each time slot contains 16 pieces of word data identified by WD0 to WD15, as is shown in FIG. 3(c). This number may be varied in accordance with the number of data communication devices in the network. With the instant frame structure, data equivalent to 256 words (=16 words×16 time slots) can be transmitted in each data frame.

Figure 4:
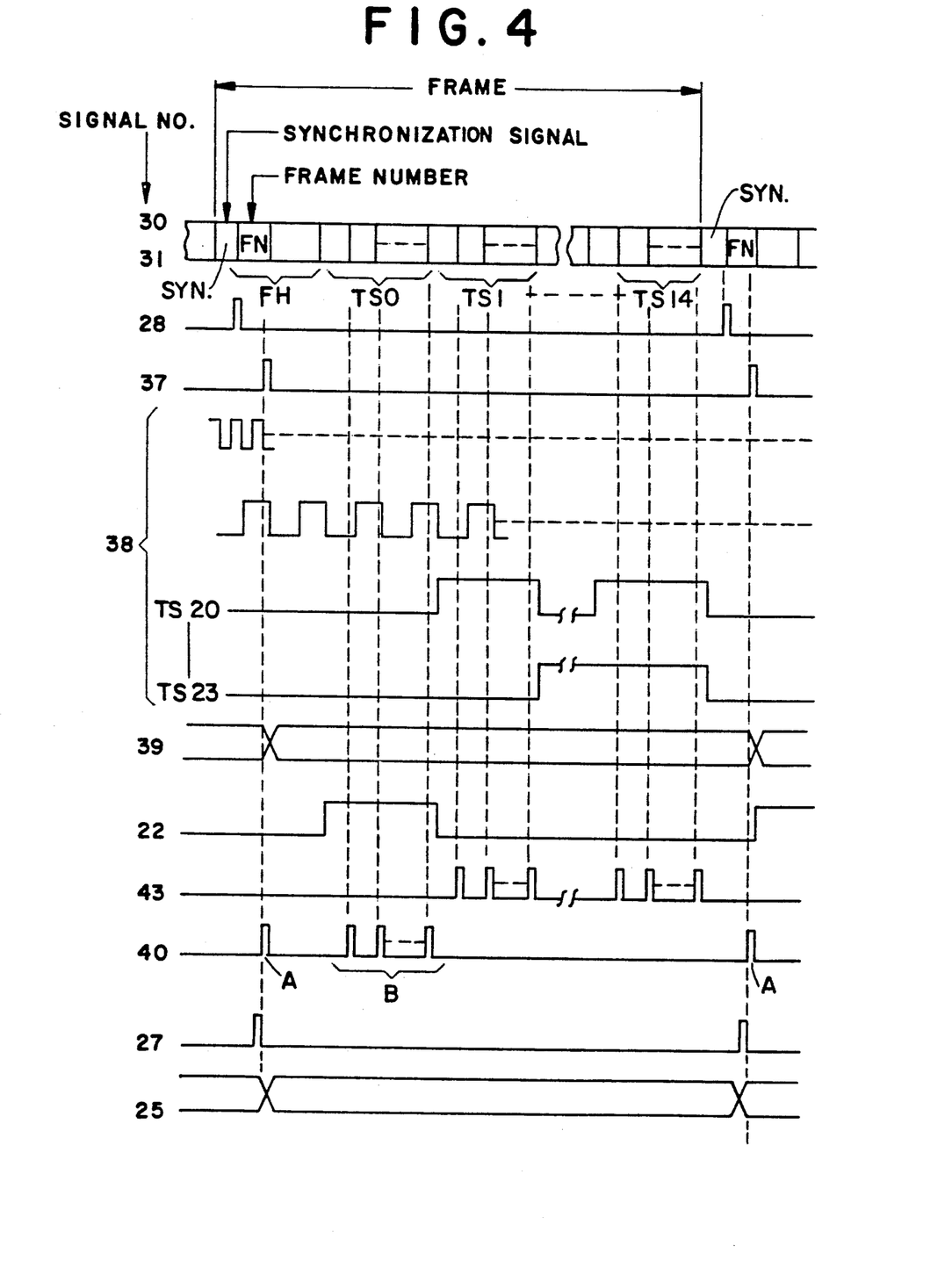
FIG. 4 is a timing diagram of data transmission of the present invention.
Figure 5:
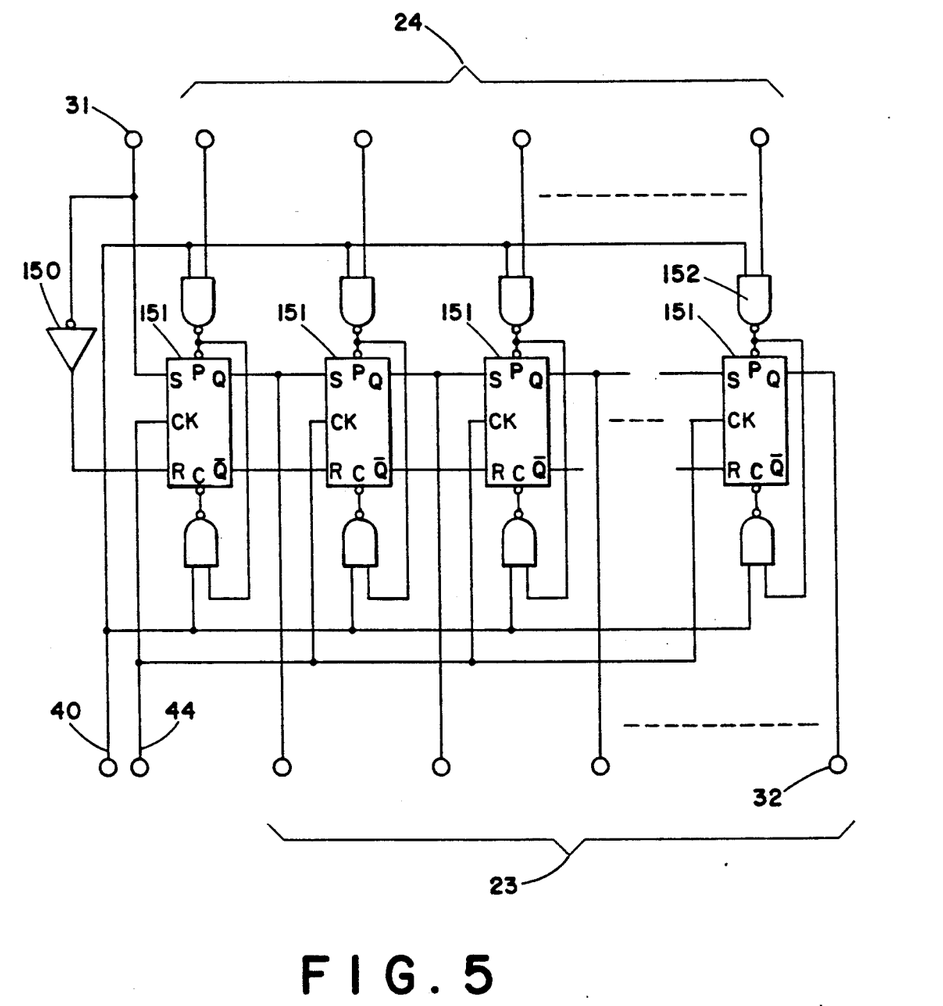
FIG. 5 is a schematic of a suitable shift register of FIG. 2.

Next, reception and transmission operation of the data transmission apparatus will be illustrated, with added reference to the timing chart of FIG. 4.

The frame signal received from the transmission line 50 is utilized to generate the shift register clock signal 44 and the basic clock signal 29. These signals are synchronized with the bits contained in the frame signal by means of the phase-locked oscillator (not shown) of the timing generator circuit 12. The shift register 11 responds to the shift register clock signal 44 to fetch and store the data contained in the frame on the bit-by-bit basis. A suitable shift register is found in a configuration such as that illustrated in FIG. 5. As will be seen in the figure, the shift register is composed of inverter 150, R/S flip-flops 151 and NAND gates 152. With such a shift register arrangement, the frame signal 31, which is serially input thereto, undergoes serial to parallel conversion, forming a parallel output signal 23.

Upon reception of a "start" portion of the input frame, the parallel output signal 23 of the shift register 11 is compared with the set value 34 of the synchronous pattern SYN through the comparison circuit 2A to check for coincidence therebetween. When such a coincidence is found, a synchronous pattern detection signal denoted by signal 28, as illustrated in the timing chart of FIG. 4, is applied to the frequency division counter 5. Therein, the signal 28 is counted with the basic clock signal 29, whereby an output signal 38 is generated which is synchronized with the frame structure.

In the course of the frame inputting, there exists a point in time at which the frame number FN will appear in the parallel output signal 23. At that time, the frequency division counter 5 applies the signal 37 to the clock of the received identifier register 4 to allow the frame number of FN to be stored therein. The frame number thus stored is output from the register 4 as output signal 39, which is then combined with the output signal 38 of the frequency division counter 5 to create the word address signal 20 which is utilized as a special code capable of discerning the frame data structure. More specifically, with the word address signal 20, it is possible to distinguish amongst the different frames to identify the data placed in the frame. This is possible given that, since the frame number FN differs from one frame to another, the output of the frequency division counter 5 for the time slots and the words contained therein necessarily differ from one frame to another. By utilizing the word address signal 20 as an address signal for the memory 1, it is possible to fixedly establish a one-to-one correspondence between the word data in the frame and the word data within the memory 1. Hence, transmission of surplus address data is unnecessary, and a more efficient percentage of working data is realized.

As used herein, a "read" mode is defined as a taking of data from a specified address of memory 1, and transferring it to a preselected time slot of a memory frame bearing a frame number corresponding to a specified address of another device in the network via shift register 11. A "write" mode is the complementary function wherein data received from the network via shift register 11 is written into the memory 1 in an address corresponding to the frame number of the frame from which the data was received.

In a write mode operation, the write address setting circuit 3 is preloaded with data indicative of the memory address and time slot into which data is to be written in a corresponding network device. Assuming now that the word address signal 20, containing the output signal 39 of the received identifier register 4, is found to coincide with the preset value of the write address setting circuit 3 by comparator 2C, in the present embodiment the signal 22 assumes "1" during the duration of the time slot from which the transfer is to be made (TS0 in the FIGURE) and "0" in the other regions. When this signal is "1", the data at the address of the memory 1, is derived as a memory data signal 26. The signal 22 also toggles, as necessary, selector 10 such that the signal 26 is produced as the output signal 24, and thereby applied as a parallel input signal to the shift register 11. At this time, a signal designated by A in FIG. 4 at 40 is applied to the shift register 11 as the load timing signal 40 to cause the output signal 26 of the memory 1 to be written as the word data in the time slot. The "1" level therefore selects an output from memory 1.

The memory 1 is set to its "write" mode when the signal 22 is "0", at which time the parallel output signals of the shift register 11, such as indicated by B at 40 in the time chart of FIG. 4, is stored in the memory 1 at the location designed by the word address signal 20. Thus, the word data of the time slot in the shift register at a given time is written in the memory 1. In this way, the data contained in the time slot which is sent out by another data transmission apparatus can be fetched into the memory of the station under consideration.

In this manner, the arithmetic units and the input/output units connected to the data transmission apparatus, illustrated in the embodiment of FIG. 2, can access to the memory 1 with a data signal 35 and an address and control signal 36, to thereby communicate with the respective arithmetic units and input/output units which are placed under control of other data transmission apparatuses.

It is seen from the above that a series of frame numbers or identifiers which correspond to the available memory locations are desirable for optional functioning of the apparatus. This is accomplished by the station serving as the master (control station), as noted above. Next, an identifier updating operation performed by the control station apparatus will be described.

The identifier is created and updated by counting up the 16-bit from "0" to "65535" by ones. Accordingly, the identifier generator counter circuit 8 is suitably comprised of a common 16-bit counter. The output signal 25 of the identifier generator counter counter 8 is written through the selector 10 into the frame number (FN) field under the control of the load timing signal. The load timing signal is changed-over or toggled by the signal 22 at the point in time when data for the frame number (FN) is present in the shift register 11 (i.e. at the time point corresponding to A of the signal 40, shown in the timing chart of FIG. 4). The identifier value as written in is held in the counter 8 until the count-up command 27 is again inputted. When the frame comes back to the original sending station, after having traveled around the transmission loop, the parallel output signal 23 of the shift register 11 is compared, in the comparison circuit 2B, with the value being held at that point in time by the identifier counter. When the comparison results in coincidence, the count-up (updating) signal 27 is applied to the identifier generating counter 8, at the timing represented by the signal 27 in the timing chart of FIG. 4, whereby the content of the counter 8 is incremented by "1". The resulting value is then sent out as the updated or new frame identification number. When the frame number has attained the maximum value "65535", it is again set to "0" and again incremented on every transmission from the value.

In the case of the illustrative embodiment, the ratio at which data occupies the available area of a frame is 93.8% (=15/16). When the sender address corresponding to one word is allocated to a time slot, as in the case of the token passing system, the above-mentioned ratio is reduced to 87.9% (15/16×15/16).

Assuming, for example, that the frame length is 125 microseconds, the transfer period can be shortened to a value approximately equal to a quotient resulting from division of 125 microseconds by the number of the data transmission apparatuses on the communications network. Accordingly, one transfer period may be made equal to four frames, i.e. 1 millisecond (125 microseconds×4). Thus, the subject data communication apparatus is advantageously suited for applications in which a short period, on the order of 1 millisecond to 4 milliseconds, is required.

As a modification of the illustrated embodiment of the invention, a time slot data may be supplemented with redundant data for error checking purposes, with a view to improving the reliability of transmitted data. A suitable error check method may be incorporated, such as parity check, reversed-twice-transfer check, CRC, and others. With such a modification, the data transmission can enjoy increased reliability.

The invention has been described with reference to the preferred embodiment. Obviously, modifications and alterations will occur to others upon reading and understanding the preceding detailed description. It is intended that the invention be construed as including all such alterations and modifications insofar as they come within the scope of the appended claims or the equivalents thereof.

Having thus described the invention, it is now claimed:

1. A data communication apparatus comprising:
   first generator means for generating data for a plurality of data frames, each data frame including a frame header section and a data field section;
   the frame header section including a synchronization field portion for transmission of synchronization data generated by the first generator means, and a frame identification field portion for transmission of frame identification data generated by the first generator means which provides respective data frames with unique identifiers representative of at least a portion of a remote memory address to which access is desired;
   means for supplying frame identification data to a plurality of successive frame identification field portions, wherein frame identification data of each successive data frame is distinguishable from frame identification data of a next preceding data frame and a next succeeding data frame; and
   means for transmitting the plurality of data frames.

2. A method of data communication comprising the steps of:
   (a) generating data for a plurality of data frames, each data frame including a frame header section and a data field section, the frame header being representative of at least a portion of a remote memory address to which access is desired;
   (b) generating data for a synchronization field as part of the frame header section for transmission of synchronization data;
   (c) generating data for a frame identification field as part of the frame header section for transmission of frame identification data;
   (d) supplying frame identification data to a plurality of successive frame identification fields, wherein the frame identification data provides respective data frames with unique identifiers for discriminatingly identifying the frame, representative of at least a portion of a remote memory address; and
   (e) transmitting the plurality of data frames to an associated receiver means.

3. A data communication system comprising:
   (a) a master control system including
   (i) first generator means for generating data for a plurality of data frames, each data frame including a frame header section and a data field section;
   (ii) the frame header section including a synchronization field portion for transmission of synchronization data generated by the first generator means, and a frame identification field portion for transmission of frame identification data generated by the first generator means, the frame identification field portion being representative of at least a portion of a remote memory address to which access is desired;
   (iii) means for supplying frame identification data to a plurality of successive frame identification field portions, wherein frame identification data provides respective data frames with unique identifiers for discriminatingly identifying the frame, representative of at least a portion of a remote memory; and
   (iv) means for transmitting the plurality of data frames;
   (b) a communications network means for carrying the plurality of data frames to another location.

4. A data communication apparatus comprising:
   first generator means for generating data for a plurality of data frames, each data frame including a frame header section and a data field section;
   the frame header section including a synchronization field portion for transmission of synchronization data generated by the first generator means, and a frame identification field portion for transmission of frame identification data generated by the first generator means;
   means for supplying frame identification data to a plurality of successive frame identification field portions, wherein frame identification data of each successive data frame is distinguishable from frame identification data of a next preceding data frame and a next succeeding data frame;
   means for transmitting the plurality of data frames;
   receiver means for receiving data frames generated by the generator means;
   means for decoding synchronization data of a received data frame;

second generator means for generating a timing signal in accordance with decoded synchronization data;

means for comparing frame identification data of a received data frame to a preselected parameter; and third generator means for generating a detection signal as a result of a comparison of frame identification data and the preselected parameter.

5. The data transmission apparatus of claim 4 further comprising:

second decoding means for decoding data of the frame header section; and second decoding means for decoding data of the frame header section; and fourth generator means for generating a memory address signal in accordance with decoded data from the second decoding means.

6. The data transmission apparatus of claim 5 wherein each data frame has a substantially equivalent duration, and wherein each data field is comprised of a plurality of time slots each having a substantially equivalent duration.

7. The data transmission apparatus of claim 6 further comprising a means for selecting one of a memory read and a memory write in accordance with data of a received frame header section.

8. The data transmission apparatus of claim 7 further comprising memory means for selectively performing at least one of storage and retrieval of information in accordance with a memory address signal of the fourth generator means.

9. A data transmission apparatus comprising:

first generator means for generating data for a plurality of data frames, each data frame including a frame header section and a data field section;

the frame header section including a synchronization field portion for transmission of synchronization data generated by the first generator means, and a frame identification field portion for transmission of frame identification data generated by the first generator means;

means for supplying frame identification data to a plurality of successive frame identification field portions, wherein the frame identification data of each successive data frame is distinguishable from frame identification data of a next preceding data frame and a next succeeding data frame, and the frame identification data provides respective data frames with unique identifiers representative of at least a portion of a remote memory address to which access is desired; and means for transmitting the plurality of data frames;

wherein each data frame has a substantially equivalent duration, and wherein each data field is comprised of a plurality of time slots each having a substantially equivalent duration.

10. A method of data communication comprising the steps of:

(a) generating data for a plurality of data frames, each data frame including a frame header section and a data field section;

(b) generating data for a synchronization field as part of the frame header section for transmission of synchronization data;

(c) generating data for a frame identification field as part of the frame header section for transmission of frame identification data;

(d) supplying frame identification data to a plurality of successive frame identification fields, wherein frame identification data of each successive data frame is distinguishable from frame identification data of a next preceding data frame and a next succeeding data frame;

(e) transmitting the plurality of data frames to an associated receiver means;

(f) receiving a plurality of received data frames;

(g) decoding synchronization data of a received data frame;

(h) generating a timing signal in accordance with decoded synchronization data;

(i) comparing frame identification data of a received data frame to preselected data; and (j) generating a detection signal as a result of a comparison of frame identification data and preselected data.

11. The method of data communication of claim 10 further comprising the step of:

decoding of the frame header section; and generating a memory address signal in accordance with decoded data from the decoding of the frame header section.

12. The method of data communication of claim 11 further comprising the steps of:

assigning each data frame an equivalent duration; and defining each data field to include a plurality of time slots, each having a substantially equivalent duration.

13. A method of data communication comprising the steps of:

(a) generating data for a plurality of data frames, each data frame including a frame header section and a data field section;

(b) generating data for synchronization field as part of the frame header section for transmission of synchronization data;

(c) generating data for a frame identification field as part of the frame header section for transmission of frame identification data;

(d) supplying frame identification data to a plurality of successive frame identification fields, wherein frame identification data of each successive data frame is distinguishable from frame identification data of a next preceding data frame and a next succeeding data frame, and which frame identification data provides respective data frames with unique identifiers representative of at least a portion of a remote memory address to which access is desired;

(e) transmitting the plurality of data frames to an associated receiver means;

(f) assigning each data frame a generally equivalent duration; and (g) defining each data field to include a plurality of time slots, each time slot having a substantially equivalent duration.

14. A method of data communication comprising the steps of (a) generating data for a plurality of data frames, each data frame including a frame header section and a data field section;

(b) generating data for synchronization field as part of the frame header section for transmission of synchronization data;

(c) generating data for a frame identification field as part of the frame header for transmission of frame identification data;

(d) supplying frame identification data to a plurality of successive frame identification fields, wherein frame identification data of each successive data frame is distinguishable from frame identification data of a next preceding data frame and a next succeeding data frame;

(e) performing one of a memory read and a memory write in accordance with decoded data of the frame header section;

(f) transmitting the plurality of data frames to an associated receiver means;

(g) assigning each data frame a generally equivalent duration; and (h) defining each data field to include a plurality of time slots, each time slot having a substantially equivalent duration.

15. A method of data communication of comprising the steps of:

(a) generating data for a plurality of data frames, each data frame including a frame header section and a data field section;

(b) generating data for a synchronization field as part of the frame header section for transmission of synchronization data;

(c) generating data for a frame identification field as part of the frame header section for transmission of frame identification data;

(d) supplying frame identification data to a plurality of successive frame identification fields, wherein the frame identification data of each successive data frame is distinguishable from frame identification data of a next preceding data frame and a next succeeding data frame;

(e) transmitting the plurality of data frames to an associated receiver means;

(f) assigning each data frame a generally equivalent duration;

(g) defining each data field to include a plurality of time slots, each time slot having a substantially equivalent duration; and (h) wherein said frame identification data provides respective data frames with unique identifiers representative of at least a portion of a remote memory address to which access is desired.

16. A data communication network comprising:

(a) a master control system including
 (i) first generator means for generating data for a plurality of data frames, each data frame including a frame header section and a data field section;
 (ii) the frame header section including a synchronization field portion for transmission of synchronization data generated by the first generator means, and a frame identification field portion for transmission of frame identification data generated by the first generator means;
 (iii) means for supplying frame identification data to a plurality of successive frame identification field portions, wherein frame identification data of each successive data frame is distinguishable from frame identification data of a next preceding data frame and a next succeeding data frame;
 (iv) means for transmitting the plurality of data frames;

(b) a communications network means for carrying the plurality of data frames to another location;

(c) a first receiver means including
 (i) means for obtaining a plurality of received data frames from the communications network means;
 (ii) first decoding means for decoding synchronization data of a received data frame;
 (iii) second generator means for generating a timing signal in accordance with decoded synchronization data;
 (iv) means for comparing frame identification data of a received data frame to preselected data; and
 (v) third generator means for generating a detection signal as a result of a comparison of frame identification data and preselected data.

17. A data communication network comprising:

(a) a master control system including
 (i) first generator means for generating data for a plurality of data frames, each data frame including a frame header section and a data field section;
 (ii) the frame header section including a synchronization field portion for transmission of synchronization data generated by the first generator means, and a frame identification field portion for transmission of frame identification data generated by the first generator means;
 (iii) means for supplying frame identification data to a plurality of successive frame identification field portions, wherein frame identification data of each successive data frame is distinguishable from frame identification data of a next preceding data frame and a next succeeding data frame and wherein the frame identification data provides respective data frames with unique identifiers respresentative of at least a portion of a remote memory address to which access is desired;
 (iv) means for transmitting the plurality of data frames;

(b) a communications network means for carrying the plurality of data frames to another location; and (c) a first receiver means adapted to receive data frames from the communication network means including
 (i) a transmission means for transmitting data in data fields of a selected subset of the plurality of data frames.

18. A data communication network comprising:

(a) a master control system including
 (i) first generator means for generating data for a plurality of data frames, each data frame including a frame header section and a data field section;
 (ii) the frame header section including a synchronization field portion for transmission of synchronization data generated by the first generator means, and a frame identification field portion for transmission of frame identification data generated by the first generator means;
 (iii) means for supplying frame identification data to a plurality of successive frame identification field portions, wherein frame identification data of each successive data frame is distinguishable from frame identification data of a next preceding data frame and a next succeeding data frame, and which frame identifications data provides respective data frames with unique identifiers representative of at least a portion of a remote memory address to which access is desired;

(iv) means for transmitting the plurality of data frames;

(b) a communications network means for carrying the plurality of data frames to another location; and (c) a first receiver means adapted to receive data frames from the communication network means including; and (d) a second receiver means for receiving data from the data fields of a selected subset of the plurality of data frames.

19. A data communication network comprising (a) a master control system including (i) first generator means for generating data for a plurality of data frames, each data frame including a frame header section and a data field section;

(ii) the frame header section including a synchronization field portion for transmission of synchronization data generated by the first generator means, and a frame identification field portion for transmission of frame identification data generated by the first generator means;

(iii) means for supplying frame identification data to a plurality of successive frame identification field portion, wherein frame identification data of each successive data frame is distinguishable from frame identification data of a next preceding data frame and a next succeeding data frame;

(iv) means for transmitting the plurality of data frames;

(b) a communications network means for carrying the plurality of data frames to another location;

(c) a first receiver means adapted to receive data frames from the communication network means including (i) a transmission means for transmitting data in data fields of a selected subset of the plurality of data frames; and (d) a second receiver means for receiving data from data fields of a selected subset of the plurality of data frames.

20. The data communication network of claim 19 further comprising a plurality of data transmission apparatuses, each including a master control system and a communications network means, such that any of said plurality of data transmission apparatuses is adapted for functioning as a master station under direction of a control station identifying circuit.

* * * * *